United States Patent [19]
Kawakami et al.

[11] Patent Number: 5,946,205
[45] Date of Patent: Aug. 31, 1999

[54] POWER CONVERSION SYSTEM WITH SERIES CONNECTED SELF-COMMUTATED CONVERTERS

[75] Inventors: Noriko Kawakami, Tokyo; Shoichi Irokawa, Saitama-ken; Hirokazu Suzuki; Kenichi Suzuki, both of Kanagawa-ken, all of Japan

[73] Assignees: Kabushiki Kaisha Toshiba, Kawasaki; Tokyo Electric Power Company Incorporated, Tokyo, both of Japan

[21] Appl. No.: 08/953,376

[22] Filed: Oct. 17, 1997

[30] Foreign Application Priority Data

Oct. 18, 1996 [JP] Japan .................................. 8-276371

[51] Int. Cl.⁶ .................................................. H02M 7/00
[52] U.S. Cl. .............................. 363/65; 363/71; 363/96; 307/82
[58] Field of Search ............................... 363/65, 67, 71, 363/96, 129; 307/82, 24

[56] References Cited

U.S. PATENT DOCUMENTS

| | | | |
|---|---|---|---|
| 5,179,510 | 1/1993 | Tokiwa et al. ........................... | 363/54 |
| 5,473,528 | 12/1995 | Hirata et al. ............................ | 363/71 |
| 5,666,275 | 9/1997 | Inokuchi et al. ........................ | 363/35 |

OTHER PUBLICATIONS

Masahiro Takasaki, et al., Transactions of the Institute of Electrical Engineers of Japan, vol. 8, No. 638, pp. 862 and 863, Aug. 1996, "Development of Cascade Multi–Connected Self–Commutated Converters".

Primary Examiner—Shawn Riley
Attorney, Agent, or Firm—Oblon, Spivak, McClelland, Maier & Neustadt, P.C.

[57] ABSTRACT

A power conversion system including a plurality of converter transformers. AC side windings of the converter transformers are connected in series for connecting to an AC power system. The power conversion system further includes a plurality of series connected voltage source type self-commutated converters for converting AC power into DC power or DC power into AC power. Each of the voltage source type self-commutated converters is connected to one of DC side windings of the converter transformers, respectively. The power conversion system further includes a plurality of DC voltage sources. Each of DC output sides of the voltage source type self-commutated converters is connected to one of the DC voltage sources, respectively. The power conversion system further includes a control system for controlling the voltage source type self-commutated converters such that each of DC voltages of the voltage source type self-commutated converters follows to one of DC voltage reference values for the voltage source type self-commutated converters, respectively.

10 Claims, 15 Drawing Sheets

POWER CONVERSION SYSTEM WITH SERIES CONNECTED SELF-COMMUTATED CONVERTERS

BACKGROUND OF THE INVENTION

1. Field of the Invention

This invention relates to a power conversion system, and more particularly to a power conversion system composed of voltage source type self-commutated converters in a multiplexed configuration and a control system of these voltage source type self-commutated converters when these voltage source type self-commutated converters are applied to such systems as DC transmission systems, fuel cells, battery energy storage systems, and reactive power compensation systems.

2. Description of the Related Art

A power conversion system composed of conventional voltage source type self-commutated converters in a multiplexed configuration and a control system of these voltage source type self-commutated converters will be described hereinafter with reference to FIG. 14 and FIG. 15. In FIG. 14, 1 is an AC system, 2 is a potential transformer to measure an AC system voltage of AC system 1, 3 is a current transformer, and 4A, 4B are converter transformers to connect voltage source typo self-commutated converters 5A, 5B to AC system 1. 6 is a DC voltage source composed of DC capacitor, cell, etc., 7 is a DC voltage detector, and 8 is an active/reactive power detector to detect active and reactive powers that are output from converters 5A, 5B by inputting detected values of potential transformer 2 and current transformer 3. 9 is a DC voltage controller to input a difference between a DC voltage reference 51 and a DC voltage detected value 52 detected by DC voltage detector 7 and to control the DC voltage so as to make the difference zero. 10 is a reactive power controller to input a difference between a reactive power reference 53 and a reactive power detected value 54 detected by active/reactive power detector 8 and to control the reactive power so as to make the deference zero. 11 is an AC current controller to control the AC current to a reference value by inputting an output of DC voltage controller 9, an output of reactive power controller 10, an AC current detected value 55 detected by current transformer 3 and an AC voltage detected value 56 detected by potential transformer 2. 12 is a pulse width modulation circuit to decide pulse patterns of self-turn-off devices composing each of self-commutated converters 5A, 5B according to the output of AC current controller 11.

In FIG. 15, 13A–13L are self-turn-off devices such as gate turn-off thyristors (hereinafter referred to as GTO) and 14–14L are diodes. Furthermore, 1A, 1B and 1C designate A-phase, B-phase and C-phase of AC system 1, respectively. The principle of control of active/reactive power of voltage source type self-commutated converters 5A, 5B connected to AC system 1 is disclosed in a publication titled "Semiconductor Power Conversion Circuit" (published from The Institute of Electrical Engineers of Japan), P.215–220, etc. and the detailed description will be therefore omitted here. In addition, the principle and realizing a method of a constant current control circuit are disclosed in Japanese Patent Publication (Kokai) No. Hei 1-77110, and therefore, the detailed description will be omitted here.

In FIG. 15, the AC system side windings of converter transformers 4A, 4B are connected in series, the DC side winding thereof are connected to each of converters 5A, 5B individually, and the DC outputs of voltage source type self-commutated converters 5A, 5B are connected in parallel with each other. In this configuration, as for the AC system output voltage, the outputs of converters 5A and 5B are added through the AC windings of converter transformers 4A, 4B and higher harmonics thereof are negated. In addition, as the AC windings of converter transformers 4A, 4B are connected in series, the current values of converters 5A, 5B become the same. Further, as the DC sides of converters 5A, 5B are connected in parallel with each other, the DC voltage of converters 5A, 5B become the same. In the configuration shown in FIG. 14, higher harmonics can be decreased in the AC system output voltage by converters 5A, 5B, and in addition, no unbalanced current and voltage will be generated between converters 5A, 5B.

The multiplexed configuration of conventional voltage source type self-commutated converters shown in FIG. 14 has the following problem when considering the application of it to, such as, a DC transmission system to transmit DC power over a long distance. That is, as DC outputs of the converters are connected in parallel, if the number of converters is increased for attaining the large capacity, DC current will increase accordingly. In case of the DC transmission system, a DC line is long and the resistance of a DC transmission line is large. If DC current increases, the power loss by the resistance of the DC transmission line also increases in proportion to a square of DC current, and the efficiency of the system will drop. Therefore, when applying the conventional power conversion system to, such as, the DC transmission system, in case of increasing the system capacity, it is preferred to increase the DC voltage rather than increasing the DC current from the viewpoint of reducing the loss.

It can be also considered, as one method to increase the DC voltage, to increase rated DC voltage of the converters and thereby make rated DC current small. However, in case of self-commutated converters with a large capacity, as it is not possible to increase switching frequency of the converter from the viewpoint of reducing the switching loss, the multiplexing of converters becomes indispensable for reducing higher harmonics.

As described above, instead of the conventional multiplexed configuration of converters to connect the DC sides of converters in parallel, a power conversion system with the multiplexed configuration of converters and its control system which does not increase DC current is demanded.

SUMMARY OF THE INVENTION

Accordingly, one object of this invention is to provide a power conversion system composed of voltage source type self-commutated converters In a multiplexed configuration and a control system of these voltage source type self-commutated converters which does not increase DC currents of these voltage source type self-commutated converters.

These and other objects of this invention can be achieved by providing a power conversion system including a plurality of converter transformers. AC side windings of the converter transformers are connected in series for connecting to an AC power system. The power conversion system further includes a plurality of series connected voltage source type self-commutated converters for converting AC power into DC power or DC power into AC power. Each of the voltage source type self-commutated converters is connected to one of DC side windings of the converter transformers, respectively. The power conversion system further includes a plurality of DC voltage sources. Each of DC output aides of the voltage source type self-commutated converters is connected to one of the DC voltage sources, respectively. The power conversion system further includes a control system for controlling the voltage source type self-commutated converters such that each of DC voltages of the voltage source type self-commutated converters follows to one of DC voltage reference values for the voltage source type self-commutated converters, respectively.

According to one aspect of this invention, there is provided a power conversion system including a plurality of converter transformers. AC side windings of the converter transformers are connected in series for connecting to an AC power system. The power conversion system further includes a plurality of series connected voltage source type self-commutated converters for converting AC power into DC power or DC power into AC power. Each of the voltage source type self-commutated converters is connected to one of DC side windings of the converter transformers, respectively. The power converter further includes a plurality of DC voltage sources. Each of DC output sides of the voltage source type self-commutated converters is connected to one of the DC voltage sources, respectively. The power converter further includes a DC voltage source connected in parallel with the series connected voltage source type self-commutated converters, and a control system for controlling the voltage source type self-commutated converters such that each of DC voltages of the voltage source type self-commutated converters except one of the voltage source type self-commutated converters follows to one of DC voltage reference values for the voltage source type self-commutated converters, respectively.

According to another aspect of this invention, there is provided a power conversion system including a plurality of converter transformers. AC side windings of the converter transformers are connected in series for connecting to an AC power system. The power conversion system further includes a plurality of series connected voltage source type self-commutated converters for converting AC power into DC power or DC power into AC power. Each of the voltage source type self-commutated converters is connected to one of DC side windings of the converter transformers, respectively. The power conversion system further includes a plurality of DC voltage sources. Each of DC output sides of the voltage source type self-commutated converters is connected to one of the DC voltage sources, respectively. The power conversion system further includes a DC voltage detector for detecting a DC voltage of the power conversion system, and a control system for controlling the voltage source type self-commutated converters such that each of DC voltages of the voltage source type self-commutated converters except one of the voltage source type self-commutated converters follows to one of DC voltage reference values for the voltage source type self-commutated converters, respectively, and that the DC voltage of the power conversion system follows to a DC voltage reference value for the power conversion system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
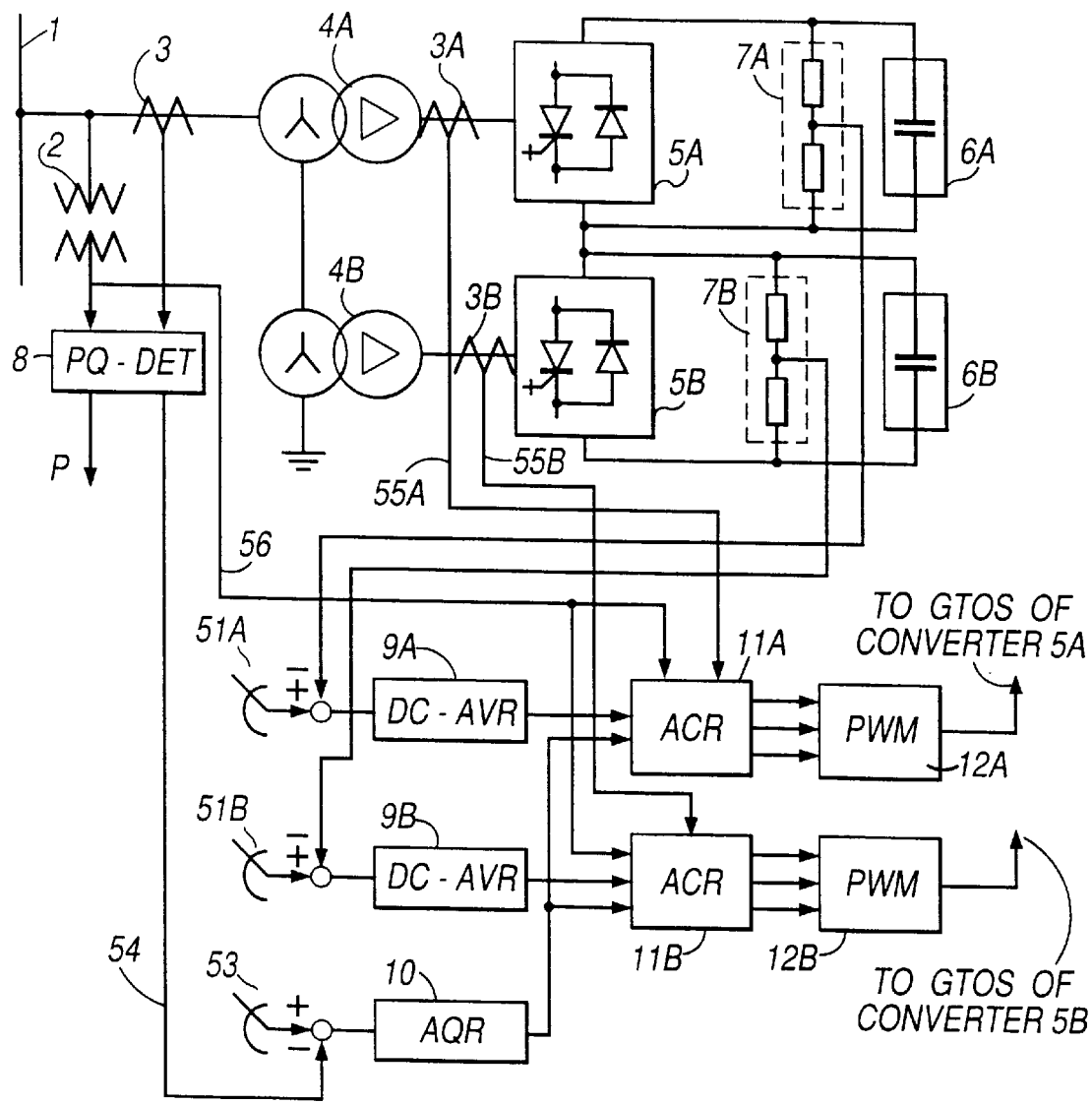
FIG. 1 is a diagram showing the construction of a power conversion system according to a first embodiment of this invention.

Referring now to the drawings, wherein like reference numerals designate identical or corresponding parts throughout the several views, the embodiments of this invention will be described below.

FIG. 1 is a diagram showing a power conversion system according to a first embodiment of the present invention. In FIG. 1, the same components are assigned with the same reference numerals as in FIG. 14 and FIG. 15 and their explanations are omitted.

In FIG. 1, voltage source type self-commutated converters 5A, 5B are connected to DC voltage sources, such as, DC capacitors 6A, 6B, the negative side of the DC output of self-commutated converter 5A is connected to the positive side of the DC output of self-commutated converter 5B, and thereby self-commutated converters 5A and 5B are connected in series.

In such the configuration as described above, it becomes possible to provide a power conversion system which makes DC voltage 2 times and DC current ½ when compared with a conventional multiplexed configuration of the unit converters (converters 5A, 5B) with the equal capacity with the DC sides connected in parallel with each other.

In the multiplexed configuration as shown in FIG. 1, as for the AC system output voltage, the outputs of converters 5A and 5B are added through the AC windings of converter transformers 4A and 4B, and higher harmonics thereof are thereby negated. Further, as the AC windings of converter transformers 4A, 4B are connected in series, the current values of converters 5A, 5B become equal. However, as the DC sides of converters 5A, 5B are connected in series, DC voltages of converters 5A, 5B may possibly be unbalanced by such factors as the delay in signal transmission, the variations in switching, the variations in main circuit constants such as the capacitances of DC capacitors 6A, 6B, etc.

So, in FIG. 1, by inputting a difference between a DC voltage of converter 5A detected by a DC voltage detector 7A and a DC voltage reference 51A into a DC voltage controller 9A, DC voltage of converter 5A is controlled so that it becomes in accord with DC voltage reference 51A of converter 5A. Similarly, by inputting a difference between a DC voltage of converter 5B detected by a DC voltage detector 7B and a DC voltage reference 51B into a DC voltage controller 9B, DC voltage of converter 5B is controlled so that it becomes in accord with DC voltage reference 51B of converter 5B.

Figure 14:
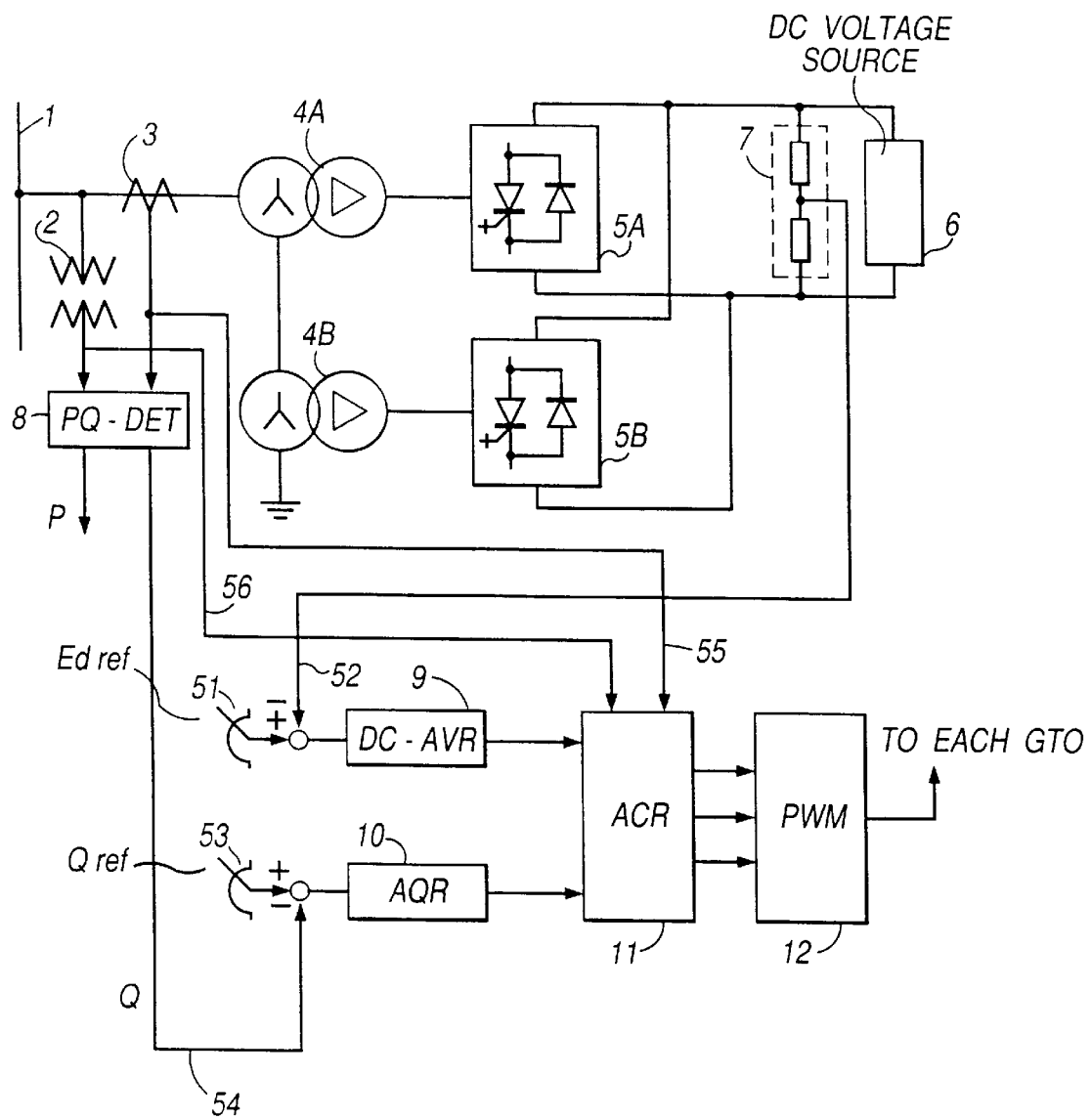
FIG. 14 is a diagram showing the construction of one example of a conventional power conversion system.

As the reactive power does not directly relate to the DC voltage, the circuit with respect to the reactive power can be the same as that shown in FIG. 14, which is the conventional multiplexed configuration.

An AC current controller is provided individually to each converter. In FIG. 1, the current at the DC winging side of converter transformer 4A is detected by a current transformer 3A as an AC current detected value 55A, and is controlled by an AC current controller 11A by inputting an AC voltage detected value 56 from potential transformer 2 so that AC current detected value 55A becomes in accord with command values from DC voltage controller 9A and reactive power controller 10. Similarly, the current at the DC winding side of converter transformer 4B is detected by a current transformer 3B as an AC current detected value 55B, and is controlled by an AC current controller 11B by inputting AC voltage detected value 56 so that AC current detected value 55B becomes in accord with command values from DC voltage controller 9B and reactive power controller 10. Pulse width modulation circuits 12A, 12B decide pulse patterns of self-turn-off devices composing each of self-commutated converters 5A, 5B according to the outputs of AC current controllers 11A, 11B, respectively.

In the multiplexed configuration as shown in FIG. 1, if the DC voltage of converter 5A detected by DC voltage detector 7A is higher than DC voltage reference 51A, DC voltage controller 9A outputs a current command to lower the DC voltage of converter 5A, and AC current controller 11A controls an output voltage command value for converter 5A so as to follow the current command value. As a result, the DC voltage of converter 5A becomes in accord with DC voltage reference 51A. Similarly, the DC voltage of converter 5B is brought to agree with DC voltage reference 51B. Accordingly, an unbalanced voltage between two converters 5A, 5B is dissolved.

Figure 2:
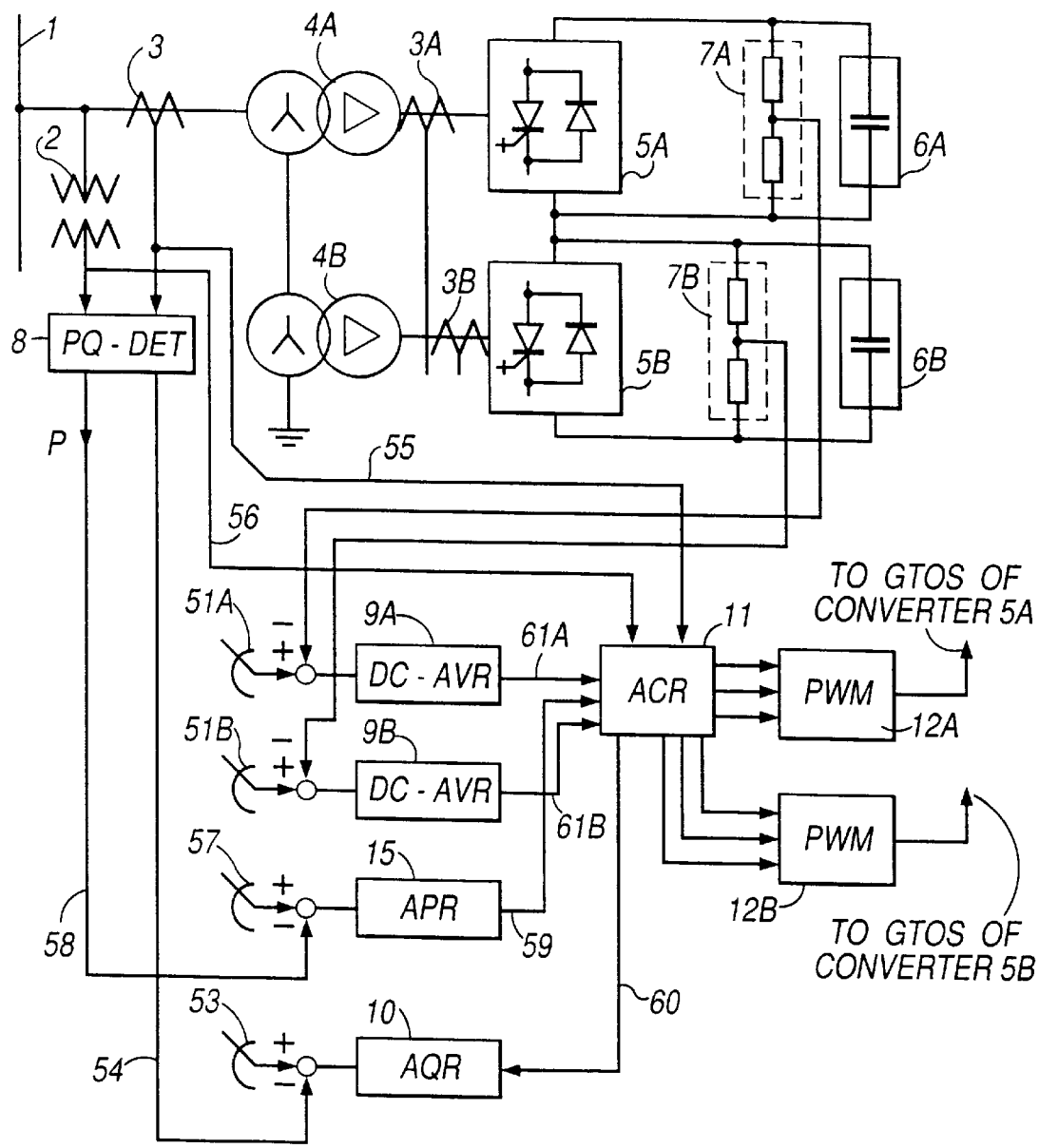
FIG. 2 is a diagram showing the construction of a power conversion system according to a modification of the first embodiment of this invention.
Figure 15:
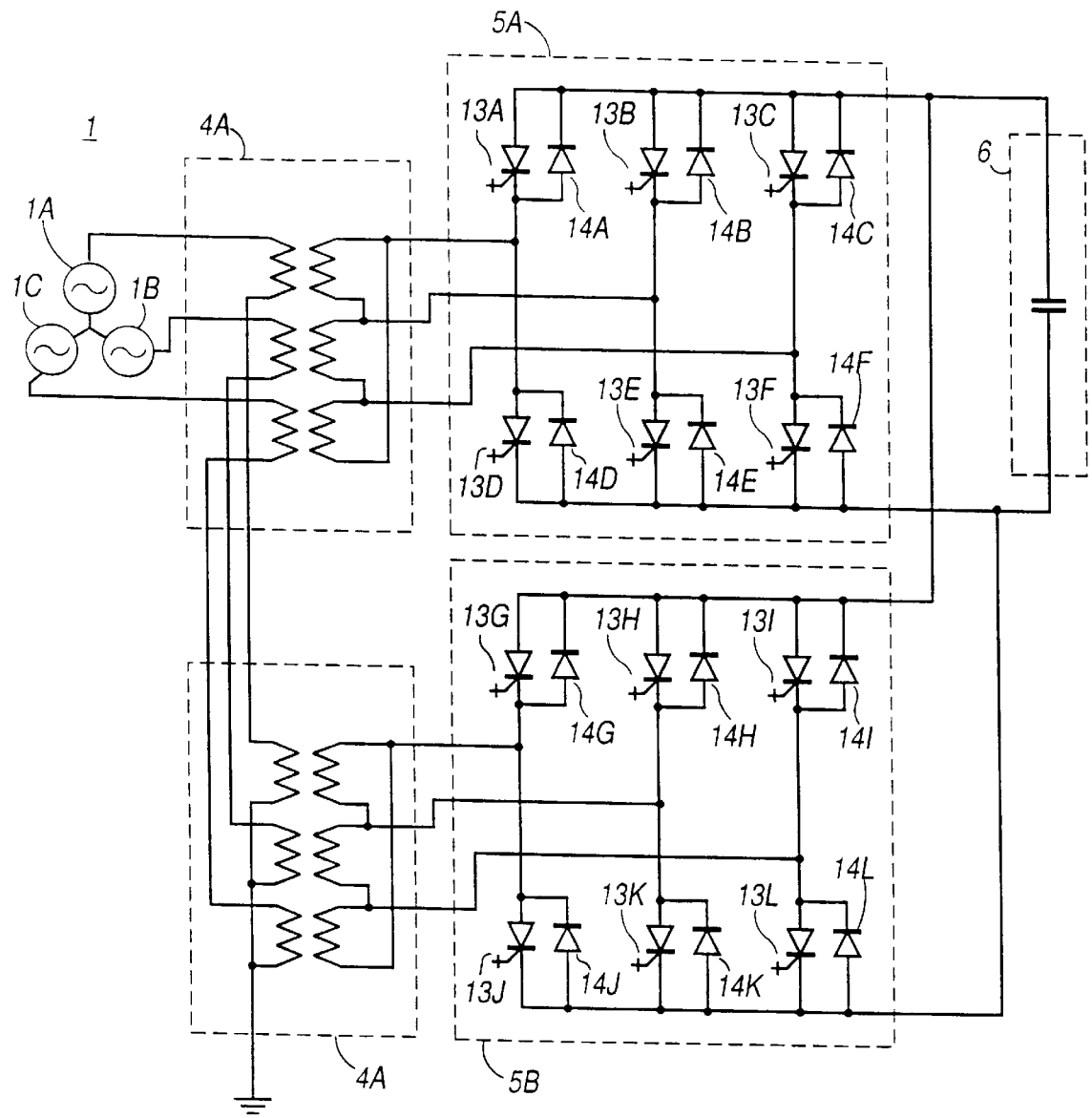
FIG. 15 is a diagram showing the construction of one example of a part of the conventional power conversion system shown in FIG. 14.

FIG. 2 is a diagram showing a modification or the first embodiment shown in FIG. 1. The same components as those shown in FIG. 1, 14 and 15 are assigned with the same reference numerals and their explanations are omitted. 15 is an active power controller which, by inputting a difference between an active power reference 57 and an active power detected value 58 detected by active/reactive power detector 8, controls the active power so as en make the difference zero.

In FIG. 2, AC current controller 11 is provided instead of AC current controllers 11A, 11B in FIG. 1. In FIG. 2, AC current is controlled by AC current controller 11 by controlling AC system current 55 detected by current transformer 3. AC current controller 11 controls AC system current 55 by inputting AC voltage detected value 56 so as to bring it to agree with an active current command value 59 which is the output or active power controller 15 and a reactive current command value 60 which is the output of reactive power controller 10. In this time, an output 61A of DC voltage controller 9A of converter 5A and an output 61B of DC voltage controller 9B of converter 5B are also input to AC current controller 11, respectively, to correct the output of AC current controller 11 to pulse width modulation circuits 12A, 12B and thus, unbalanced voltage between two converters 5A, 5B is dissolved.

In FIG. 2, as DC voltages of two converters 5A, 5B are adjusted by controlling the AC system current by one AC current controller 11 and correcting output voltage command values that are output to pulse width modulation circuits 12A, 12B, there is no interference between the AC current control system and the DC voltage control system and thereby the power conversion system can, be stably controlled.

Figure 3:
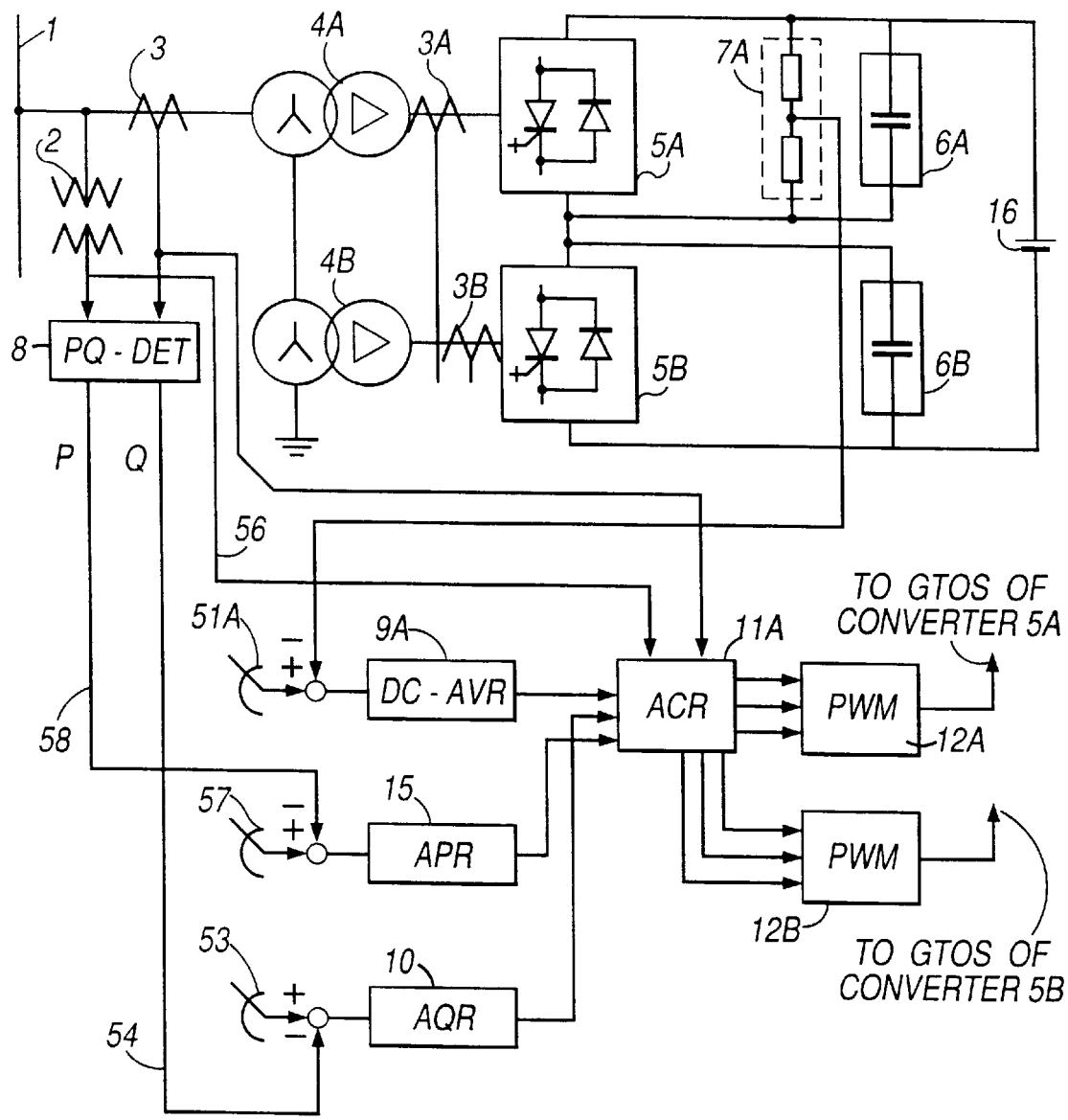
FIG. 3 is a diagram showing the construction of a power conversion system according to a second embodiment of this invention.

FIG. 3 shows a power conversion system according to a second embodiment of the present invention. In FIG. 3, the same components already shown in FIGS. 1, 2, 14, 15 are assigned with the same reference numerals and their explanations are omitted. 16 is a large capacity DC voltage source such as fuel cells, secondary cells, voltage source type converters, etc. In FIG. 3, the entire DC voltage value including DC voltages of self-commutated converters 5A, 5B is decided by this large capacity DC voltage source 16. Even when each converter 5A, 5B has a DC voltage reference and tries to control its DC voltage, if a sum or respective DC voltage references does not agree with the output voltage of large capacity DC voltage source 16, each converter 5A, 5B is not able to control its DC voltage, and the DC voltage controller is then saturated. So, as shown in FIG. 3, one self-commutated converter 5B does not control its DC voltage and the remaining self-commutated converter 5A controls its DC voltage so that the DC voltage of converter 5A detected by DC voltage detector 7A becomes in accord with DC voltage reference 51A. When DC voltage is controlled as shown in FIG. 3, it is not necessary that converter 5B controls its DC voltage, because its DC voltage is primarily decided by a value of voltage of large capacity DC voltage source 16 minus DC voltage of converter 5A. As a result, DC voltage controller 9A is not saturated and it becomes possible to control desired active power.

Although the power conversion system is described using two converters in FIG. 3, in the multiplexed configuration of more than two converters connected in series, when, except one converter, each of the remaining converters controls its DC voltage so as to agree with DC voltage reference of each converter, the power conversion system can be stably controlled without expanding unbalanced DC voltages between converters and saturating the DC voltage controller.

Figure 4:
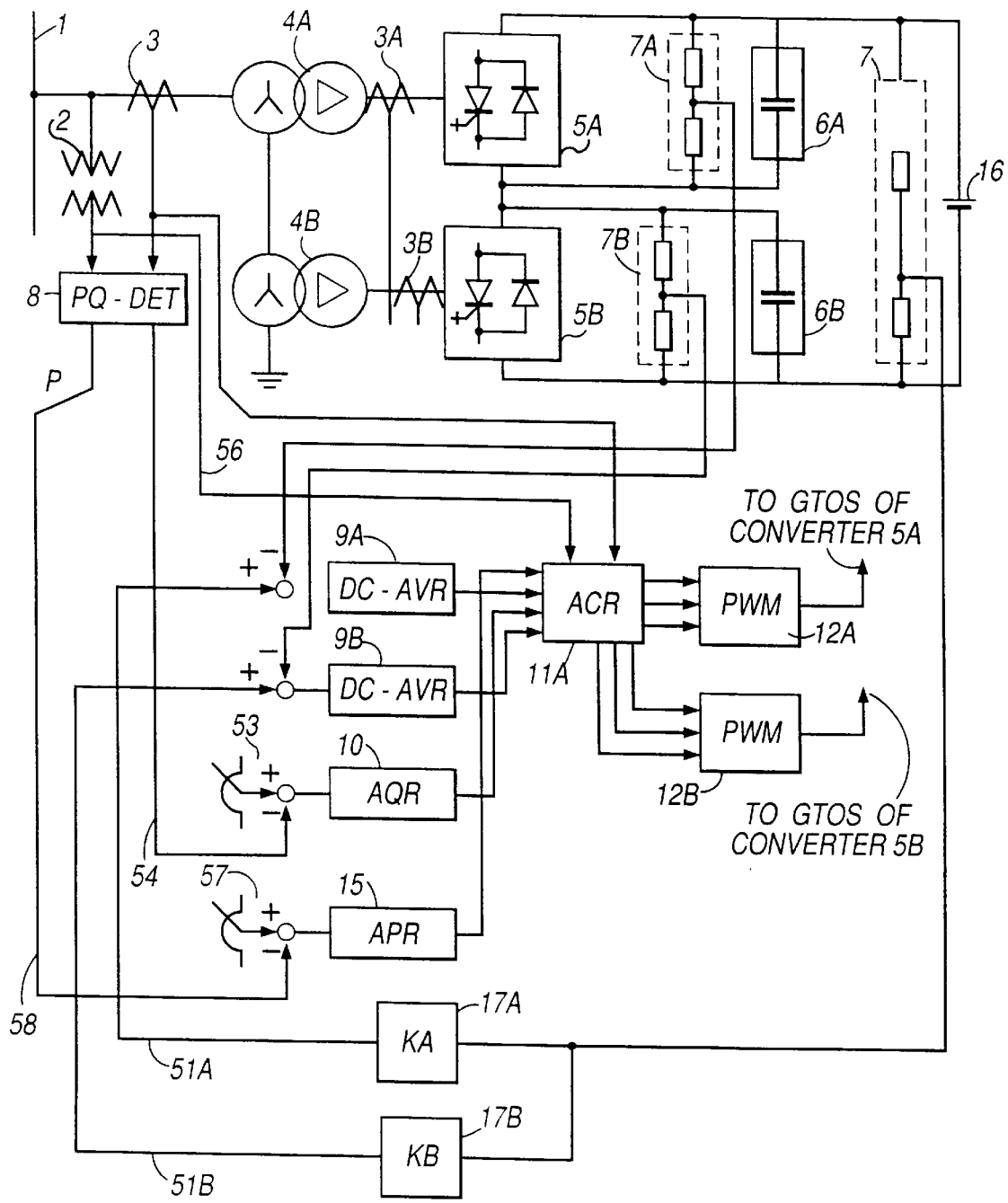
FIG. 4 is a diagram showing the construction of a power conversion system according to a third embodiment of this invention.

FIG. 4 shows a power conversion system according to a third embodiment of the present invention. In FIG. 4, the same components as those shown in already explained figures are assigned with the same reference numerals and their explanations are omitted. 7 is a DC voltage detector to detect DC voltage of large capacity DC voltage source 16, and 17A, 17B are operational amplifiers to multiply the DC voltage detected by DC voltage detector 7 by fixed factors KA, KB, respectively. The output DC voltage of large capacity DC voltage source 16 such as fuel cells, secondary cells, etc. generally fluctuates by about $\pm(20-30)$ % according to the discharge state of cells and the DC current value.

In the configuration shown in FIG. 4, DC voltage references 51A, 51B of converters 5A, 5B are not fixed, but values obtained by multiplying the DC voltage by fixed factors KA, KB are used as DC voltage reference 51A, 51B of converters 5A, 5B, respectively, and converters 5A, 5B control their output voltages to follow DC voltage references 51A, 51B, respectively. As a result, no unbalance is generated between DC voltages of converters 5A, 5B even when the DC voltage of large capacity DC voltage source 16 fluctuates.

Further, fixed factors KA, KB for DC voltage references 51A, 51B are so decided that the sum of factors KA, KB for all converters 5A, 5B becomes 1. Although, the power conversion system is described using two converters in FIG. 4, in a multiplexed configuration of more than two converters connected in series, if the DC voltage reference of each converter is decided by multiplying the detected DC voltage value by a fixed factor and the DC voltage of each converter is controlled so as to follow the DC voltage reference, the power conversion system also can be operated stably without generating unbalanced DC voltage between converters even when voltage of the large capacity DC voltage source, such as fuel cells, secondary calls, etc. fluctuates.

Figure 5:
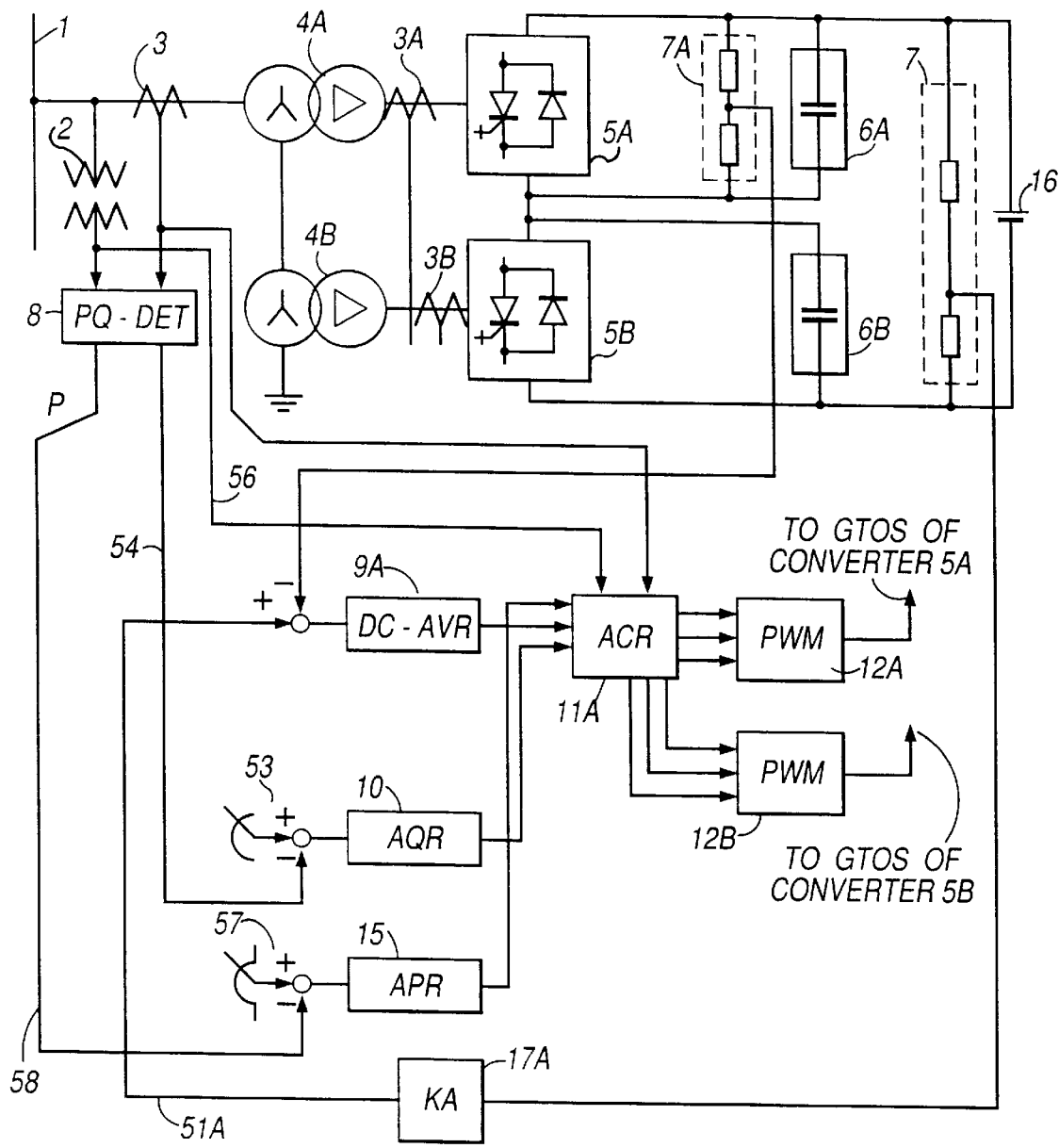
FIG. 5 is a diagram showing the construction of a power conversion system according to a fourth embodiment of this invention.

FIG. 5 shows a power conversion system according to a fourth embodiment of the present invention. In FIG. 5, the same components as those shown in the already explained figures are assigned with the same reference numerals and their explanations are omitted. In FIG. 5, DC voltage is controlled for converter 5A and not for converter 5B, the same as the embodiment shown in FIG. 3.

In FIG. 5, the entire DC voltage value including DC voltages of self-commutated converter 5A and 5B is decided by large capacity DC voltage source 16. As DC voltage reference 51A is computed by multiplying the DC voltage detected by DC voltage detector 7 by fixed factor KA, a sum of DC voltages of all converters 5A, 5B does not differ from the output voltage of large capacity DC voltage source 16.

However, if there are errors, etc. of DC voltage detectors of converters, these errors are accumulated and the DC controller may be saturated. Therefore, in the embodiment shown in FIG. 5, one self-commutated converter 5B performs only the active power control without executing the DC voltage control. Remaining self-commutated converter 5A controls its DC voltage so that the DC voltage detected by DC voltage detector 7A comes to agree with DC voltage reference 51A that is obtained by multiplying the entire DC voltage detected value by fixed factor KA.

When the power conversion system is controlled as shown in FIG. 5, DC voltage of converter 5B is primarily decided by the voltage of large capacity DC voltage source 16 minus DC voltage of converter 5A. Accordingly, even when there are errors of the detectors, the controller is not saturated and the power conversion system can be stably controlled.

Further, although two converters are used for explanation in FIG. 5, in the multiplexed configuration of more than two converters connected in series, if DC voltage is so controlled that DC voltage of each converter except the converter comes to agree with the DC voltage reference of each converter which is decided by multiplying the entire DC voltage reference by a fixed factor, the power conversion system can be stably controlled without expanding unbalanced DC voltage between converters, and generating the saturation of the DC voltage controller even when the DC voltage of the large capacity DC voltage source fluctuates.

Figure 6:
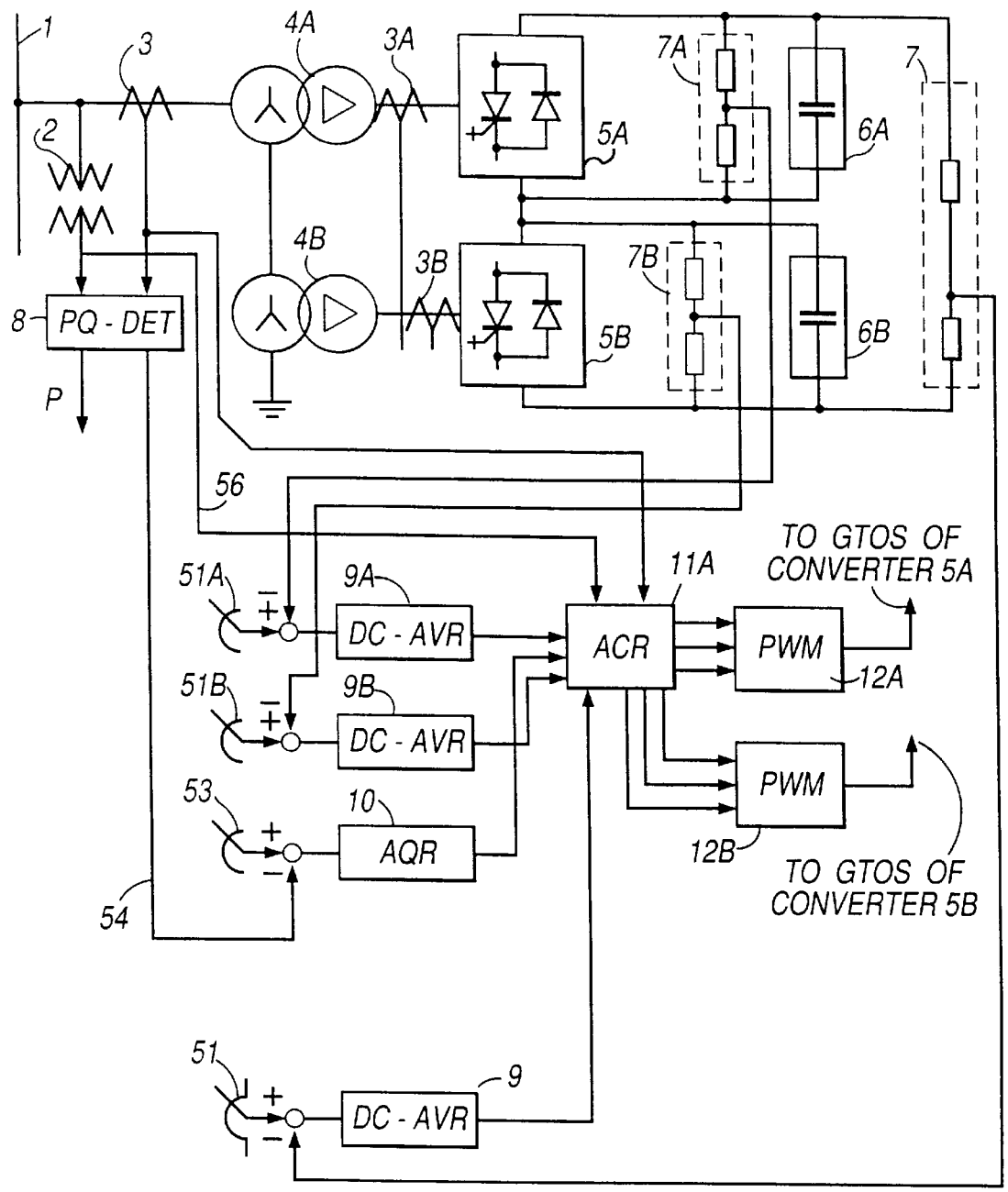
FIG. 6 is a diagram showing the construction or a power conversion system according to a fifth embodiment of this invention.

FIG. 6 shows a power conversion system according to a fifth embodiment of the present invention. In FIG. 6, the same components shown in the already explained figures are assigned with the same reference numerals and the explanation is omitted. In FIG. 6, a DC voltage of added outputs of converters 5A, 5B, that is, a DC output voltage of the power conversion system is detected by DC voltage detector 7. DC voltage of the power conversion system is controlled by DC voltage controller 9 so that the DC voltage detected by DC voltage detector 7 becomes in accord with DC voltage reference 51 of the power conversion system.

On the other hand, DC voltages of converters 5A, 5B are controlled by DC voltage controllers 9A, 9B so that they become in accord with DC voltage references 51A, 51B, respectively. In such the configuration, DC voltage controller 9 is provided to control the entire DC voltage and the entire DC voltage is easily controllable when another power conversion system is connected to this power conversion system via a DC bus and it is required to maintain the entire DC voltage at a constant level.

Figure 7:
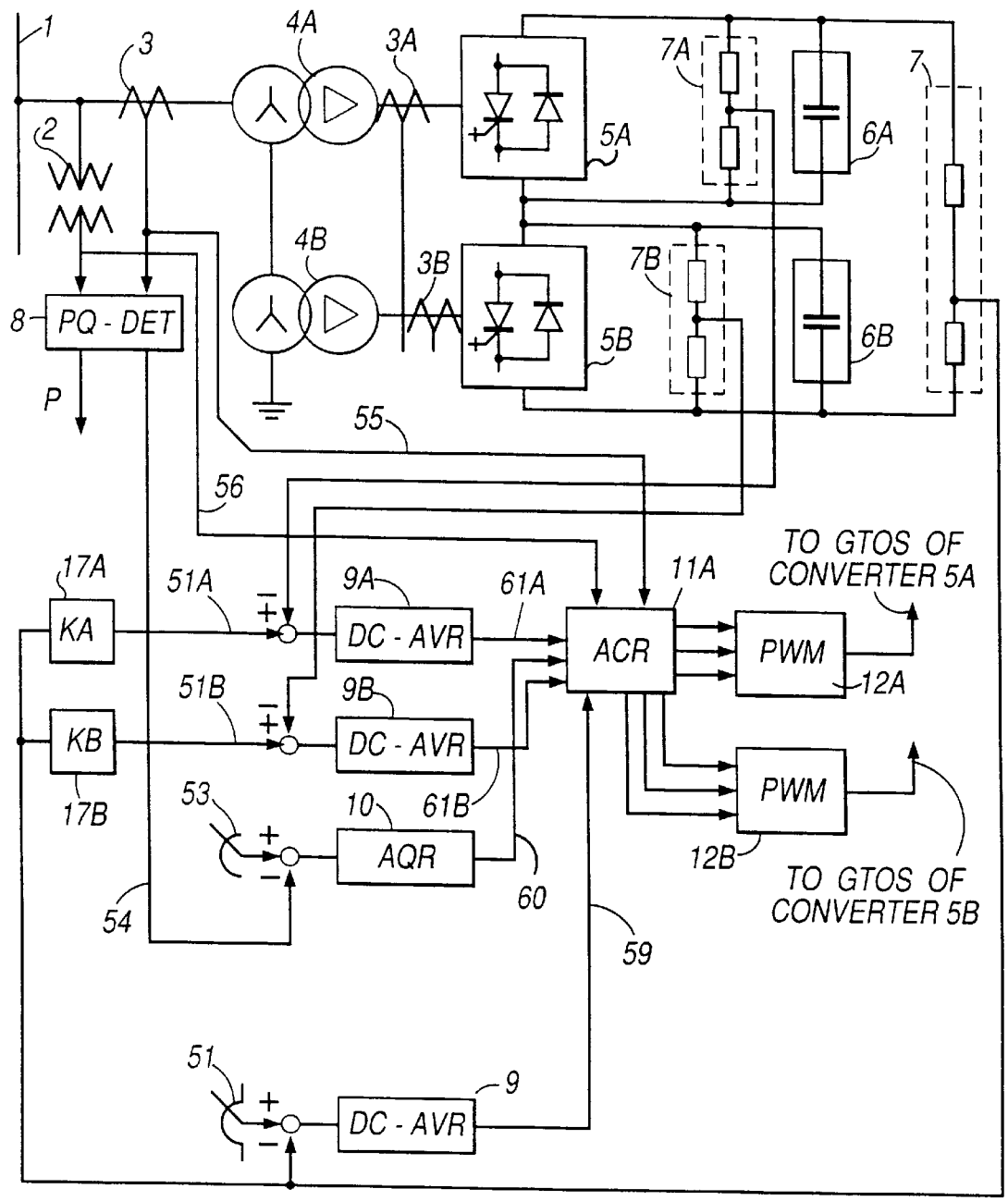
FIG. 7 is a diagram snowing the construction of a power conversion system according to a modification of the fifth embodiment of this invention.

FIG. 7 is a diagram showing a modification of the fifth embodiment shown in FIG. 6. In FIG. 7, the same components as those shown in the already explained figures are assigned with the same reference numerals and the explanation is omitted. In FIG. 7, values obtained by multiplying the entire DC voltage detected by DC voltage detector 7 by fixed factors KA, KB are used as DC voltage references 51A, 51B of converters 5A, 5B, respectively. In the configuration as shown in FIG. 7, even when the entire DC voltage fluctuates transiently due to system failure, disturbance, etc., the DC voltage control system of converters 5A, 5B control their DC voltages so as to take the balance against the entire DC voltage, respectively. Therefore, overvoltage can be prevented from being applied to either one of the converters 5A, 5B.

The action of this embodiment will further be described using FIG. 6. In FIG. 6, there are provided three DC voltage controllers: DC voltage controller 9 to control the entire DC voltage of the power conversion system; DC voltage controller 9A to control DC voltage of converter 5A; and DC voltage controller 9B to control DC voltage or converter 5B.

On the other hand, as for the DC voltages, DC voltage of converter 5A and that of converter 5B are independent, respectively, while the entire DC voltage of the power conversion system is primarily decided by adding DC voltage of converter 5A and that of converter 5B. Therefore, there are three controllers for two independent variables and if they are given with the same response speed, DC voltages cannot be controlled stably.

So, the entire DC voltage is controlled at a relatively low speed in DC voltage controller 9. As for DC voltages of converters 5A, 5B, so as to balance DC voltages between converters 5A, 5B, they are controlled in DC voltage controllers 9A, 9B at high speeds, respectively. Thus, DC voltages can be stably controlled by changing responses of three DC controllers 9, 9A, 9B, respectively.

Although FIG. 6 and FIG. 7 are explained using a configuration of two converters, in case of a multiplexed configure of more than two converters, the same effect is obtained when an entire DC voltage controller and DC voltage controllers for respective converters are provided.

Figure 8:
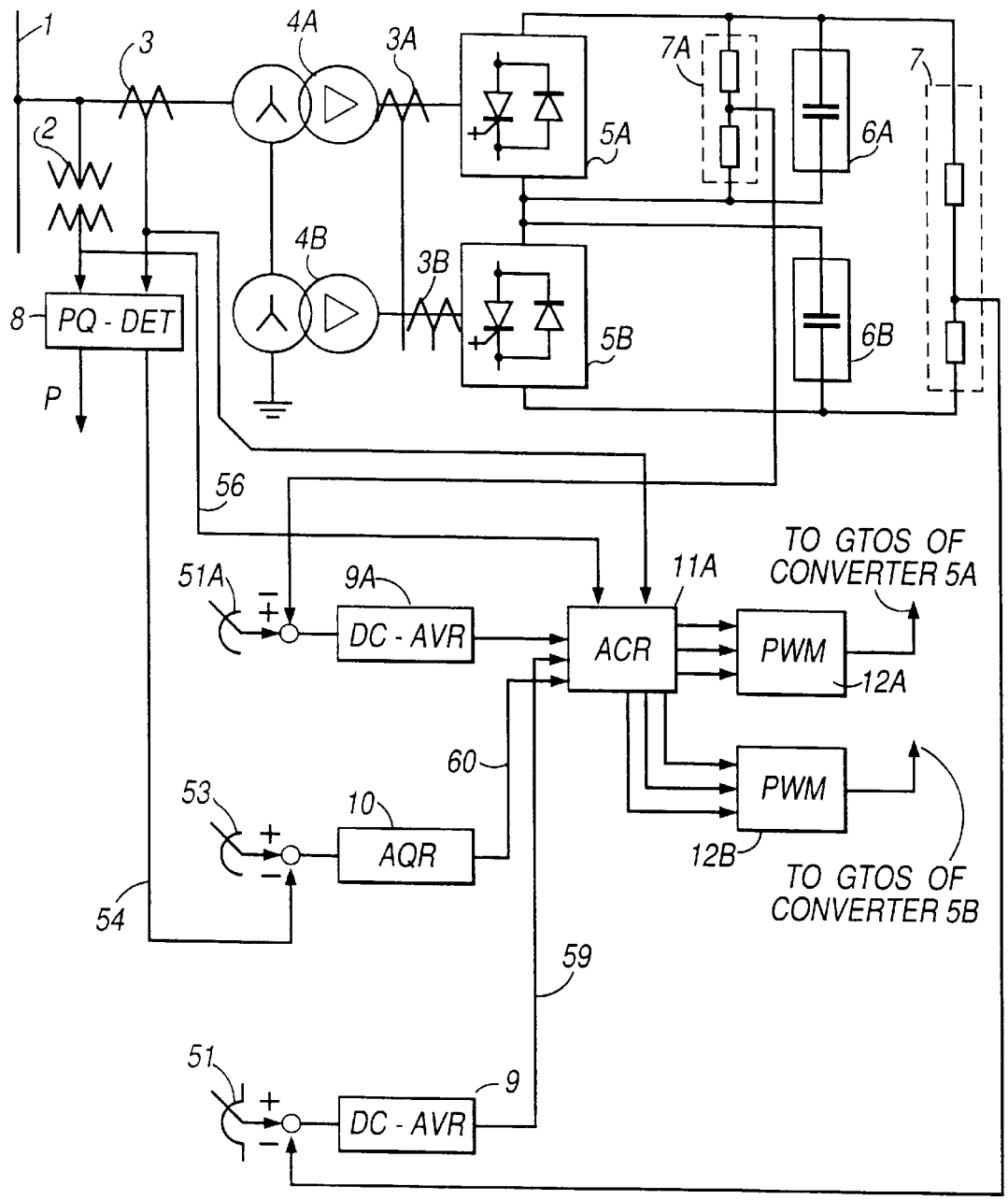
FIG. 8 is a diagram showing the construction of a power conversion system according to a sixth embodiment of this invention.

FIG. 8 is a diagram showing a power conversion system according to a sixth embodiment of the present invention. In FIG. 7, the same components as those shown in the already explained figures are assigned with the same reference numerals and the explanation is omitted.

In FIG. 8, an entire DC voltage with the outputs of converters 5A, 5B added, that is, a DC output voltage of the power conversion system, is detected by DC voltage detector 7. The DC voltage of the power conversion system detected by DC voltage detector 7 is controlled by DC voltage controller 9 so that it becomes in accord with DC voltage reference 51 of the power conversion system. On the other hand, the DC voltage of converter 5A is controlled by DC voltage controller 9A so that it becomes in accord with DC voltage reference 51A.

In such the configuration, DC voltage controller 9 is provided to control the entire DC voltage and the entire DC voltage is easily controlled when another power conversion system is connected to this power conversion system via a DC bus and it is required to maintain the entire DC voltage at a constant level. Further, as the DC voltage of converter 5B is not controlled, the response of DC voltage controller 9 for the entire DC voltage can be decided independently from the response of DC voltage of DC voltage controller 9A of converter 5A. Therefore, this configuration is suited especially when it is necessary to make the entire DC voltage control fast when demanded by the system.

Figure 9:
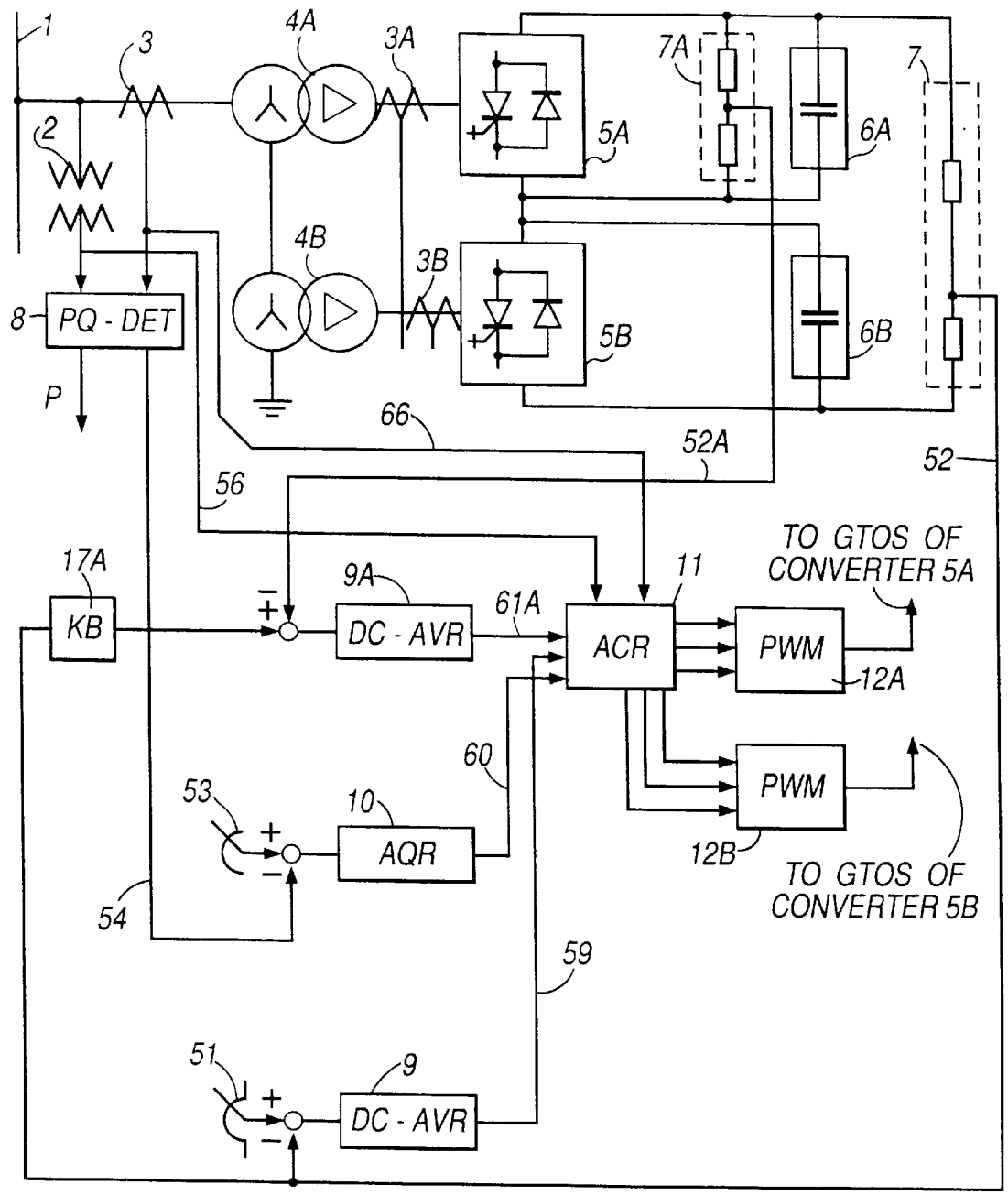
FIG. 9 is a diagram showing the construction of a power conversion system according to a modification of the sixth embodiment of this invention.

FIG. 9 is a diagram showing a modification or the sixth embodiment shown in FIG. 8. In FIG. 9, the same components as those shown in the already explained figures are assigned with the same reference numerals and the explanation is omitted. In FIG. 9, a value obtained by multiplying the entire DC voltage detected by DC voltage detector 7 by a fixed factor KA is made as DC voltage reference 51A of converter 5A.

In the configuration as shown in FIG. 9, even when the entire DC voltage fluctuates transiently due to system failure, disturbance, etc., the DC voltage control system of converter 5A controls its DC voltage so as to take the balance against the entire DC voltage. Therefore, overvoltage can be prevented from being applied to either one of the converters 5A, 5B.

Although FIG. 8 and FIG. 9 are explained using a configuration of two converters, in case of a multiplexed configuration of more than two converters, the same effect is obtained when an entire DC voltage controller and DC voltage controllers for respective converters are provided except one converter.

Figure 10:
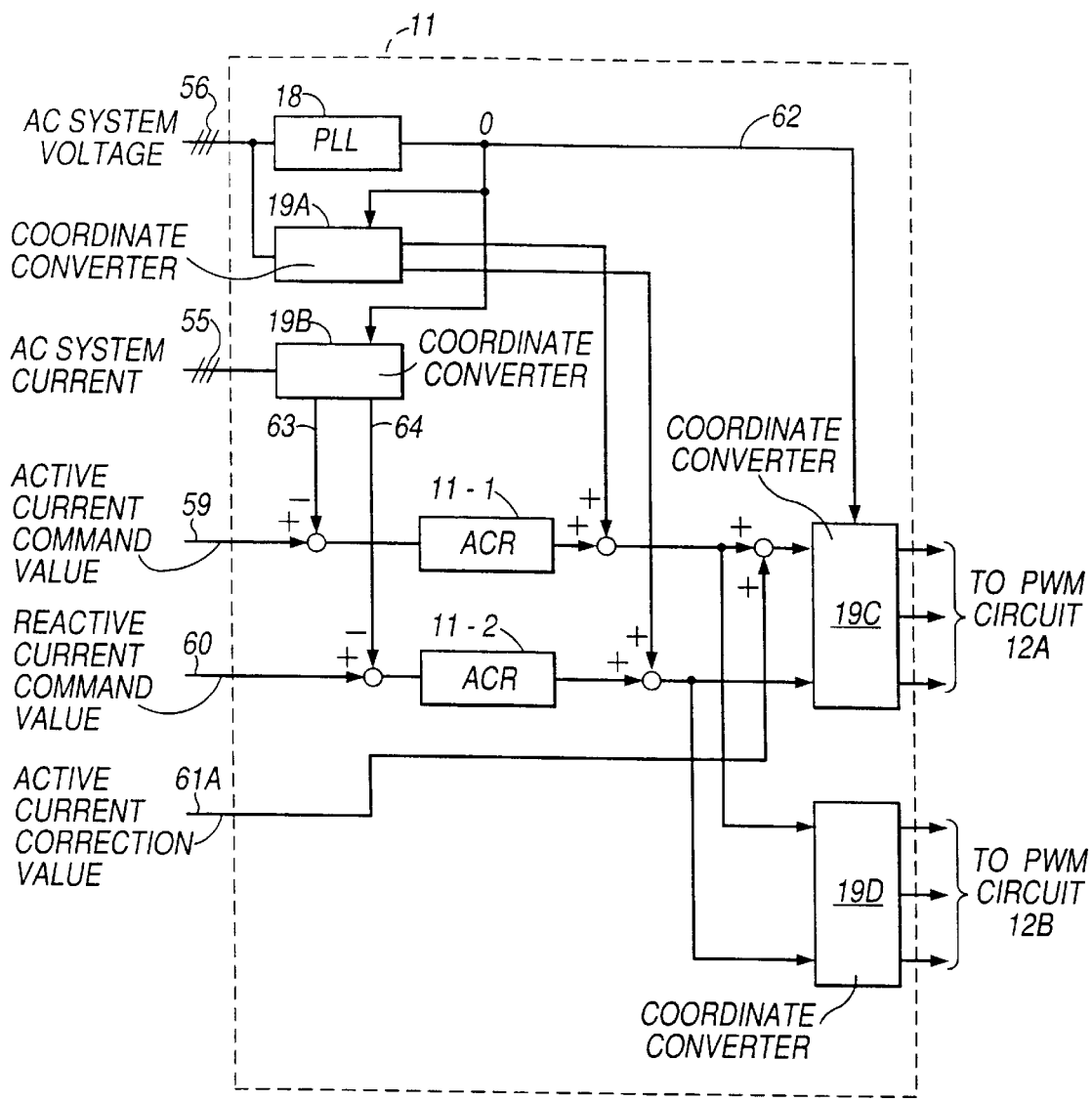
FIG. 10 is a diagram showing the construction of a part of a power conversion system according to a seventh embodiment of this invention.

FIG. 10 is a diagram showing a part of a power conversion system according to a seventh embodiment of the present invention. FIG. 10 shows an example of the construction of AC current controller 11 shown in FIG. 9. In FIG. 10, 18 is a phase detector to detect a phase of the AC system voltage from AC system voltage detected value 56. 19A is a coordinate converter to convert the AC system voltage into orthogonal biaxial components from AC system voltage phase detected value 62 detected by phase detector 18 and AC system voltage detected value 56, and 19B is a coordinate converter to convert AC current detected value 55 into an active current component 63 and a reactive current component 64 using AC system voltage phase detected value 62. 19C is a coordinate converter to compute the output voltage, command value to be given to pulse width modulation circuit 12A of converter 5A, and 19D is a coordinate converter to compute the output voltage command value to be given to pulse width modulation circuit 12B of converter 5B.

11-1 is an AC current controller to control AC current by inputting a difference between active current command value 59 that is the output of DC voltage controller 9 shown in FIG. 9 and active current component 63 that is obtained through the coordinate conversion of AC current detected value 55 and make the difference zero. 11-2 is an AC current controller to control AC current by inputting a difference between reactive current command value 60 that is the output of reactive power controller 10 shown in FIG. 9 and reactive current component 64 that is obtained through the coordinate conversion of AC current detected value 55 and make the difference zero.

Out of the actions of AC current controller 11 shown in FIG. 10, a method to convert three-phase AC voltage and current into DC quantities through the coordinate conversion and control them is an already generally known method as an AC current control method of voltage source type self-commutated converter, and therefore, its explanation is omitted here.

An active current correction value 61A shown in FIG. 10 is the output of DC voltage controller 9A that acts so as to control a DC voltage detected value 52A of converter 5A in accord with the value that is obtained by multiplying total DC voltage detected value 52 by fixed factor KA in operational amplifier 17A in order to balance DC voltages between converters 5A and 5B. The output voltage command value for converter 5A before the coordinate conversion that is input to coordinate converter 19C is corrected by active current correction value 61A.

In the configuration shown in FIG. 10, as the output voltage command value for converter 5A is corrected before the coordinate conversion by the DC voltage control system after controlling active current component and reactive current component of the AC system current independently, AC current controller 11 and DC voltage controller 9A shown in FIG. 9 can be controlled with less interference between them.

Figure 11:
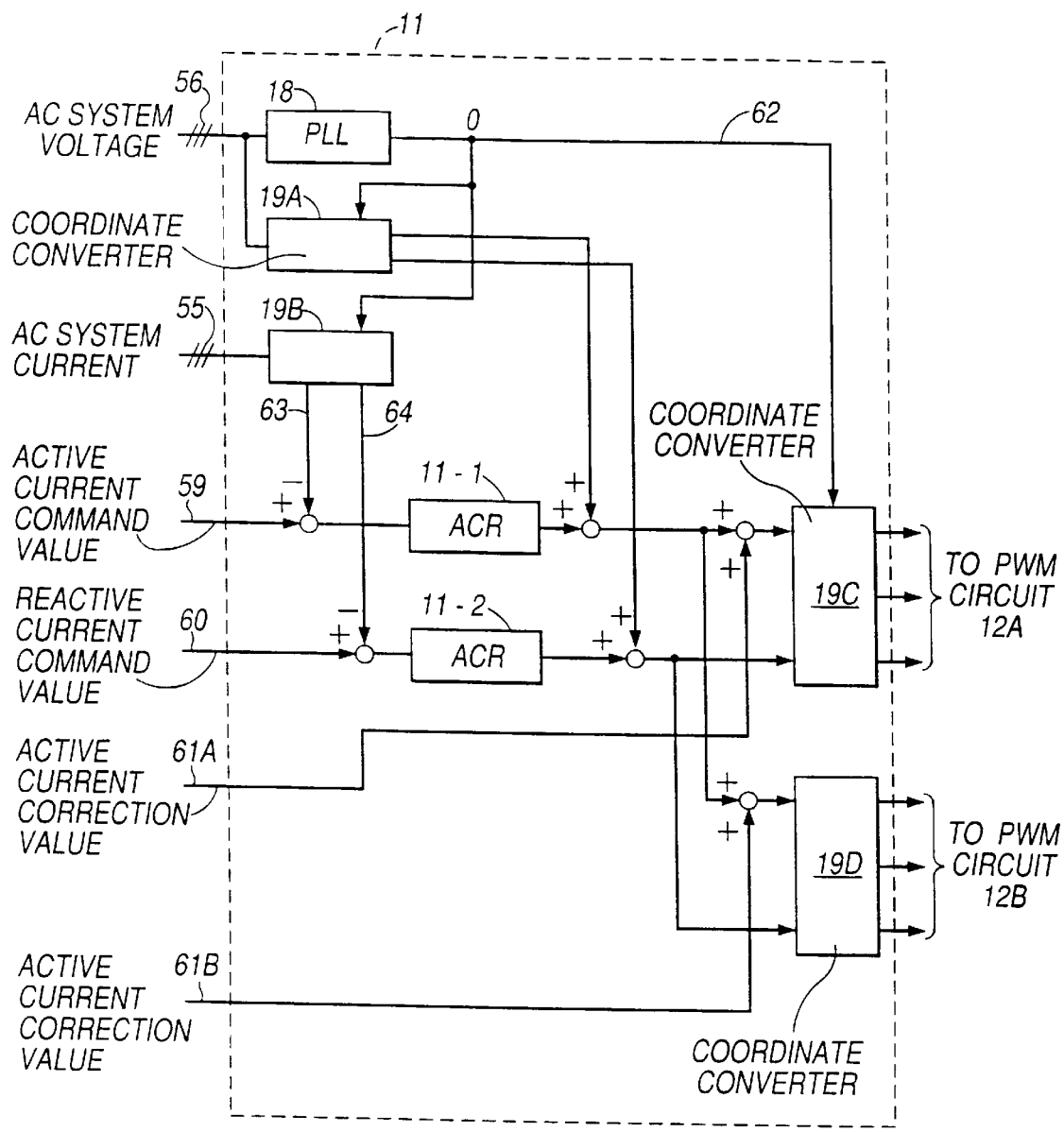
FIG. 11 is a diagram showing the construction of a part of a power conversion system according to an eighth embodiment of this invention.

FIG. 11 is a diagram showing a part of a power conversion system according to an eighth embodiment of the present invention. In FIG. 11 an example of the construction of current controller 11 already explained in FIG. 7 is shown in FIG. 11, the same components as those already explained in FIG. 10 are assigned with the same reference numerals and the explanation is omitted. In FIG. 11, AC current is controlled by AC current controller 11-1 so that active current command value 59 that is the output of DC voltage controller 9 of the power conversion system shown in FIG. 7 becomes in accord with active current component 63. Further, AC current is controlled by AC current controller 11-2 so that reactive current command value 60 that is the output of reactive power controller 10 shown in FIG. 7 becomes in accord with reactive current component 64. Output voltage command values for respective converters 5A, 5B are corrected before the coordinate conversion by active current correction value 61A that is the output of voltage controller 9A to control DC voltage of converter 5A and active current correction value 61B that is the output of DC voltage controller 9B to control DC voltage of converter 5B, respectively.

In the configuration shown in FIG. 11, as the output voltage command values for converters 5A, 5B are corrected before the coordinate conversion by the DC voltage system after controlling active current component and reactive current component of the AC system current independently, AC current controller 11 and DC voltage controllers 9A, 9B shown in FIG. 7 can be controlled with less interference between them.

Although FIG. 10 and FIG. 11 are explained using a configuration of two converters, in case of a multiplexed configuration of more than two converters, the same effect is obtained by correcting an output voltage command value of each converter by the output of the DC voltage controller of each converter.

Further, the correction methods shown in FIG. 10 and FIG. 11 are explained with respect to the power conversion systems shown in FIG. 9 and FIG. 7, respectively. A similar correcting method is also applicable to the power conversion systems shown in FIGS. 2, 3, 4, 5, 6 and 8.

Figure 12:
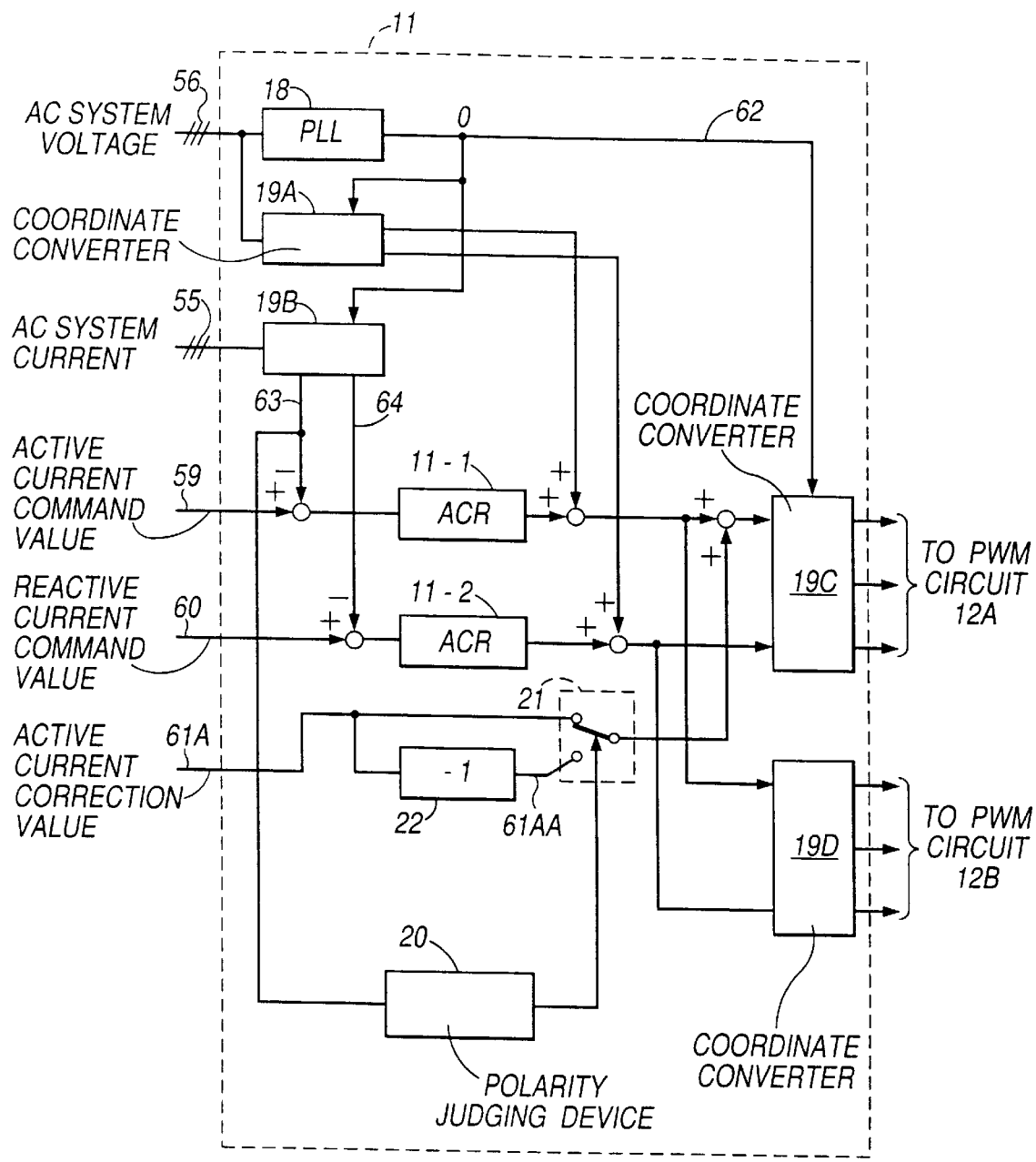
FIG. 12 is a diagram showing the construction of a part of a power conversion system according to a ninth embodiment of this invention.

FIG. 12 is a diagram showing a part of a power conversion system according to a ninth embodiment of the present invention. FIG. 12 shows an example of the construction of current controller 11 already explained in FIG. 9. In FIG. 12, the same components an those shown in the already explained figures are assigned with the same reference numerals and the explanation is omitted. In FIG. 12, 20 is a polarity judging device to judge the polarity of active current component 63, 21 is a switch that is changed over by the output of polarity judging device 20, and 22 is an inverter to change over the polarity of active current correction value 61A.

In FIG. 9, as AC side windings of converter transformers 4A, 4B are connected in series, the waveforms of the output currents of converters 5A, 5B become the same unless there are DC magnetizations, etc. in converter transformers 4A, 4B. Accordingly, when DC voltages of DC capacitors 6A, 6B of converters 5A, 5B are unbalanced and it is desirable to adjust the unbalanced DC voltages by changing active powers of converter 5A, 5B, it is required to change voltage waveforms or converters 5A, 5B, respectively.

Generally, if the current waveforms are the same, active powers can be changed by changing the amplitudes of output voltages, respectively. Here, the relation among the direction of current, the amplitude of output voltage and the voltage of DC capacitor is considered.

Now, it is assumed that the direction of current from the AC system to the converter is the forward direction. When operating as the rectifier, converter output current and converter output voltage are in the waveforms of the same polarity. When the amplitude of the output voltage is made larger, the active power in the direction of rectifier increases, and when the amplitude of the output voltage is made smaller, the active power in the direction of rectifier decreases.

When considering the DC voltage of the DC capacitor, a converter provided with a DC capacitor of lower DC voltage increases the active power in the direction of rectifier by making the amplitude of its output voltage larger and thereby to charge the DC capacitor more. A converter provided with a DC capacitor of higher DC voltage reduces the active power in the direction of rectifier by making the amplitude of the output voltage smaller and thereby to suppress the charging of the DC capacitor.

Next, inverter operation is considered. In inverter operation, converter output current and converter output voltage are in the waveforms of the opposite polarity. When the amplitude of the output voltage is made larger, the active power in the direction of inverter increases, and when the amplitude of the output voltage is made smaller, the active power in the direction of inverter decreases.

When considering the DC voltage of the DC capacitor, a converter provided with a DC capacitor of lower DC voltage decreases the active power in the direction of inverter by making the amplitude of its output voltage smaller and thereby to decrease the discharge of the DC capacitor. A converter provided with a DC capacitor of higher DC voltage increases the active power in the direction of inverter by making the amplitude of its DC voltage larger thereby to increase the discharge of the Dc capacitor.

The relation between the magnitude of the DC voltage of the DC capacitor and the amplitude of the output voltage in the rectifier and inverter operation are summarized as shown by Table.

TABLE

|  | In Rectifier Operation | In Inverter Operation |
|---|---|---|
| DC capacitor voltage: high | Amplitude of output voltage: low | Amplitude of output voltage: high |
| DC capacitor voltage: low | Amplitude of output voltage: hiqh | Amplitude of output voltage: low |

Generally, in the rectifier operation, an active current flows from the AC system to the converter, and in the inverter operation, an active current flows from the converter to the AC system.

As can be see from Table, it is necessary to change the polarity of the correction for the amplitude of the output voltage based on the direction of the active current.

In FIG. 12, the polarity of active current component 63 is judged by polarity judging device 20. Switch 21 is changed over by the output of polarity judging device 20. As a result, the correcting direction is changed by changing over an inverted active current correction value 61AA that is inverted by inverter 22 and active current correction value 61A that is not inverted. In the configuration as shown in FIG. 12, it is possible to continuously operate the power conversion system while taking the balance of DC capacitor voltages by properly correcting the output voltage command values before the coordinate conversion even when the direction of the active current is changed.

Figure 13:
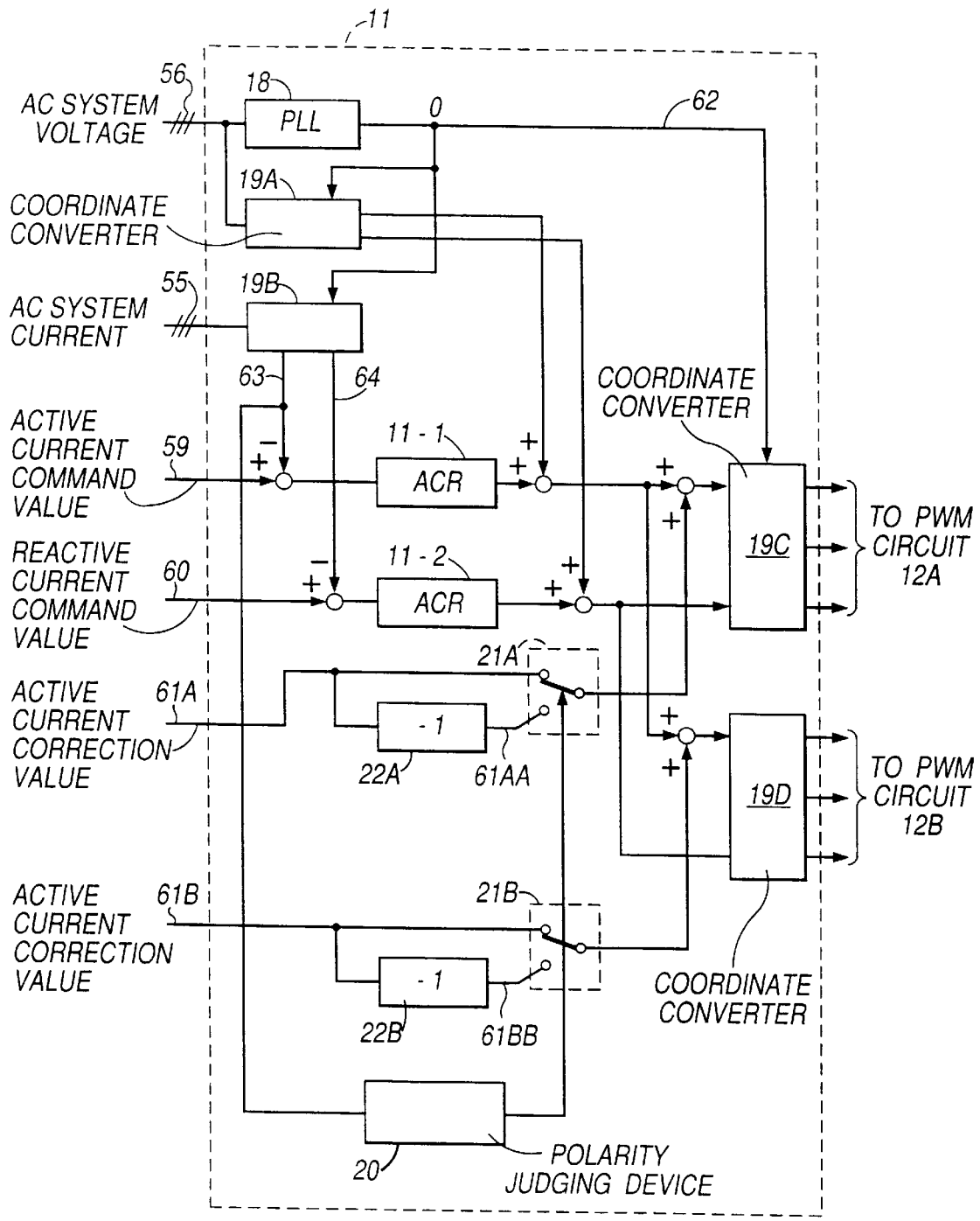
FIG. 13 is a diagram showing the construction of a part of a power conversion system according to a tenth embodiment of this invention.

FIG. 13 is a diagram showing a part of a power conversion system according to a tenth embodiment of the present invention. FIG. 13 shows one example of the construction of current controller 11 already explained in FIG. 7. In FIG. 13, the same components as those shown in the already explained figures are assigned with the same reference numerals and the explanation is omitted. In FIG. 13, 20 is polarity judging device to judge the polarity of active current component 63. 21A, 21B are switches that are changed over by the output of polarity judging device 20, and 22A, 22B are inverters to change over the polarities of active current correction values 61A, 61B, respectively. In the configuration as shown in FIG. 13, similarly to the embodiment shown in FIG. 12, it is possible to continuously operate the power conversion system while taking the balance of DC capacitor voltages by properly correcting the output voltage command values before the coordinate conversion even when the direction of the active current is changed.

Although FIG. 12 and FIG. 13 are explained using a configuration of two converters, in case of a multiplexed configuration of more than two converters, the same effect is obtained when the polarity of the correction value by the DC voltage controller of each converter is changed over according to the polarity of the active current component.

Further, the correction methods shown in FIG. 12 and FIG. 13 are explained with respect to the power conversion systems shown in FIG. 9 and FIG. 7, respectively. A similar correction method is also applicable to the power conversion systems shown in FIGS. 2, 3, 4, 5, 6 and 8.

In the embodiments described above, the DC voltage control is performed by using DC capacitors as DC voltage sources. If, for instance, fuel calls, batteries, etc. are assumed to be used as DC voltage sources, this invention can be applied to such power conversion system by replacing DC voltage controllers by active power controllers which control the active power detected by active/reactive power detector 8.

Further, although reactive power controller 10 is used in the embodiments described above, reactive power controller 10 may be replaced by an AC voltage controller that controls the AC voltage of AC system 1.

Further, this invention is further applied to a power conversion system in which the voltage source type self-commutated converter described in the preceding embodiments can be composed of three single-phase bridge units composed of self-turn-off devices and diodes instead of three phase voltage source type self-commutated converter shown in FIG. 15.

As described above, according to the invention as it is possible to increase DC voltage and decrease DC current even if the capacity of the power conversion system is the same when compared with the multiplexed configuration with converters connected in parallel, an economical power conversion system that is capable of reducing power loss can be provided even for a system of which resistance of DC line becomes large in DC transmission for a long distance, etc.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion system, comprising:

a plurality of converter transformers;

AC side windings of said converter transformers being connected in series for connecting to an AC power system;

a plurality of series connected voltage source type self-commutated converters for converting AC power into DC power or DC power into AC power;

each of said voltage source type self-commutated converters being connected to one of DC side windings of said converter transformers, respectively;

a plurality of DC voltage sources;

each of DC output sides of said voltage source type self-commutated converters being connected to one of said DC voltage sources, respectively; and control means for controlling said voltage source type self-commutated converters such that each of DC voltages of said voltage source type self-commutated converters is controlled according to one of DC voltage reference values for said voltage source type self-commutated converters, respectively.

2. A power conversion system, comprising:

a plurality of converter transformers;

AC side windings of said converter transformers being connected in series for connecting to an AC power system;

a plurality of series connected voltage source type self-commutated converters for converting AC power into DC power or DC power into AC power;

each of said voltage source type self-commutated converters being connected to one of DC side windings of said converter transformers, respectively;

a plurality of DC voltage sources;

each of DC output sides of said voltage source type self-commutated converters being connected to one of said DC voltage sources, respectively;

a DC voltage source connected in parallel with said series connected voltage source type self-commutated converters; and control means for controlling said voltage source type self-commutated converters such that each of DC voltages of said voltage source type self-commutated converters except one of said voltage source type self-commutated converters is controlled according to one of DC voltage reference values for said voltage source type self-commutated converters, respectively.

3. The power conversion system according to claim 1, further comprising:

a DC voltage source connected in parallel with said series connected voltage source type self-commutated converters; and a DC voltage detector for detecting a DC voltage of said power conversion system;

wherein said control means further includes means for determining said DC voltage reference values for said voltage source type self-commutated converters based on said DC voltage of said power conversion system such that each of said DC voltage reference values for said voltage source type self-commutated converters shares said DC voltage of said power conversion system by one of predetermined ratios, respectively.

4. The power conversion system according to claim 2, further comprising:

a DC voltage detector for detecting a DC voltage of said power conversion system;

wherein said control means further includes means for determining said DC voltage reference values for said voltage source type self-commutated converters except one of said voltage source type self-commutated converters based on said DC voltage of said power conversion system such that each of said DC voltage reference values for said voltage source type self-commutated converters except one of said voltage source type self-commutated converters shares said DC voltage of said power conversion system by one of predetermined ratios, respectively.

5. The power conversion system according to claim 1, further comprising:

a DC voltage detector for detecting a DC voltage of said power conversion system;

wherein said control means further includes means for controlling said voltage source type self-commutated converters such that said DC voltage of said power conversion system follows to a DC voltage reference value for said power conversion system.

6. The power conversion system according to claim 5, wherein said control means further includes means for determining said DC voltage reference values for said voltage source type self-commutated converters based on said DC voltage of said power conversion system such that each of said DC voltage reference values for said voltage source type self-commutated converters shares said DC voltage of said power conversion system by one of predetermined ratios, respectively.

7. The power conversion system according to claim 6, wherein:

in said control means, responses of DC voltage control of said voltage source type self-commutated converters are determined to be faster than a response of DC voltage control of said power conversion system.

8. A power conversion system, comprising:

a plurality of converter transformers;

AC side windings of said converter transformers being connected in series for connecting to an AC power system;

a plurality of series connected voltage source type self-commutated converters for converting AC power into DC power or DC power into AC power;

each of said voltage source type self-commutated converters being connected to one of DC side windings of said converter transformers, respectively;

a plurality of DC voltage sources;

each of DC output sides of said voltage source type self-commutated converters being connected to one of said DC voltage sources, respectively;

a DC voltage detector for detecting a DC voltage of said power conversion system; and control means for controlling said voltage source type self-commutated converters such that each of DC voltages of said voltage source type self-commutated converters except one of said voltage source type self-commutated converters is controlled according to one of DC voltage reference values for said voltage source type self-commutated converters, respectively, and that said DC voltage of said power conversion system follows to a DC voltage reference value for said power conversion system.

9. The power conversion system according to claim 8, wherein said control means further includes means for determining said DC voltage reference values for said voltage source type self-commutated converters except one of said voltage source type self-commutated converters based on said DC voltage of said power conversion system such that each of said DC voltage reference values for said voltage source type self-commutated converters except one of said voltage source type self-commutated converters shares said DC voltage or said power conversion system by one of predetermined ratios, respectively.

10. The power conversion system according to claim 9, wherein:

in said control means, responses of DC voltage control of said voltage source type self-commutated voltage source type self-commutated converters are determined to be faster than a response of DC voltage control of said power conversion system.

* * * * *